United States Patent

[11] 3,550,551

| [72] | Inventor | Marshall W. Miller<br>Ann Arbor, Mich. |
|---|---|---|
| [21] | Appl. No. | 852,407 |
| [22] | Filed | Aug. 22, 1969 |
| [45] | Patented | Dec. 29, 1970 |
| [73] | Assignee | General Motors Corporation<br>Detroit, Mich.<br>a corporation of Delaware |

[54] TRANSMISSION CONTROL AND INDICATOR APPARATUS
8 Claims, 6 Drawing Figs.

[52] U.S. Cl. ..................................................... 116/124,
74/484
[51] Int. Cl. ............................................. G09f 9/00
[50] Field of Search............................................. 116/124;
74/472, 473, 484; 200/61.54; 340/(Inquired);
123/(Inquired)

[56] References Cited
UNITED STATES PATENTS

| 1,427,415 | 8/1922 | Raich .............................. | 116/124 |
| 2,896,471 | 7/1959 | Hause............................. | 74/484 |
| 2,985,030 | 5/1961 | Schultz.......................... | 74/484 |
| 3,049,023 | 8/1962 | McCordic ..................... | 74/484 |
| 3,106,198 | 10/1963 | Hansen......................... | 116/124X |
| 3,292,450 | 12/1966 | Hurst et al. ................... | 74/473 |
| 3,449,980 | 6/1969 | Hulten.......................... | 74/473 |

Primary Examiner—Louis J. Capozi
Attorneys—Warren E. Finken, A. M. Heiter and John P. Moran ABSTRACT: A floor-mounted console-type transmission control mechanism and an instrument panel-mounted indicator for use with an automatic transmission and linkage means therebetween including a manual range selector handle mounted in a recess formed in the console, a first shaped bracket mounted on the transmission shift rod, first linkage means between the selector handle and a first leg of the first shaped bracket, a second shaped bracket intermediate the transmission shift rod and the steering column shift tube, a first linkage rod member between an opening adjacent one end of an angled center section of the second shaped bracket and aligned openings in second and third legs of the first shaped bracket, a second linkage rod member between an opening adjacent the other end of the angled center section of the second shaped bracket and the lower portion of the shift tube, and a link pivotally connected between the upper portion of the shift tube and the indicator for readily visible indication of the driving range corresponding to the position of the selector handle.

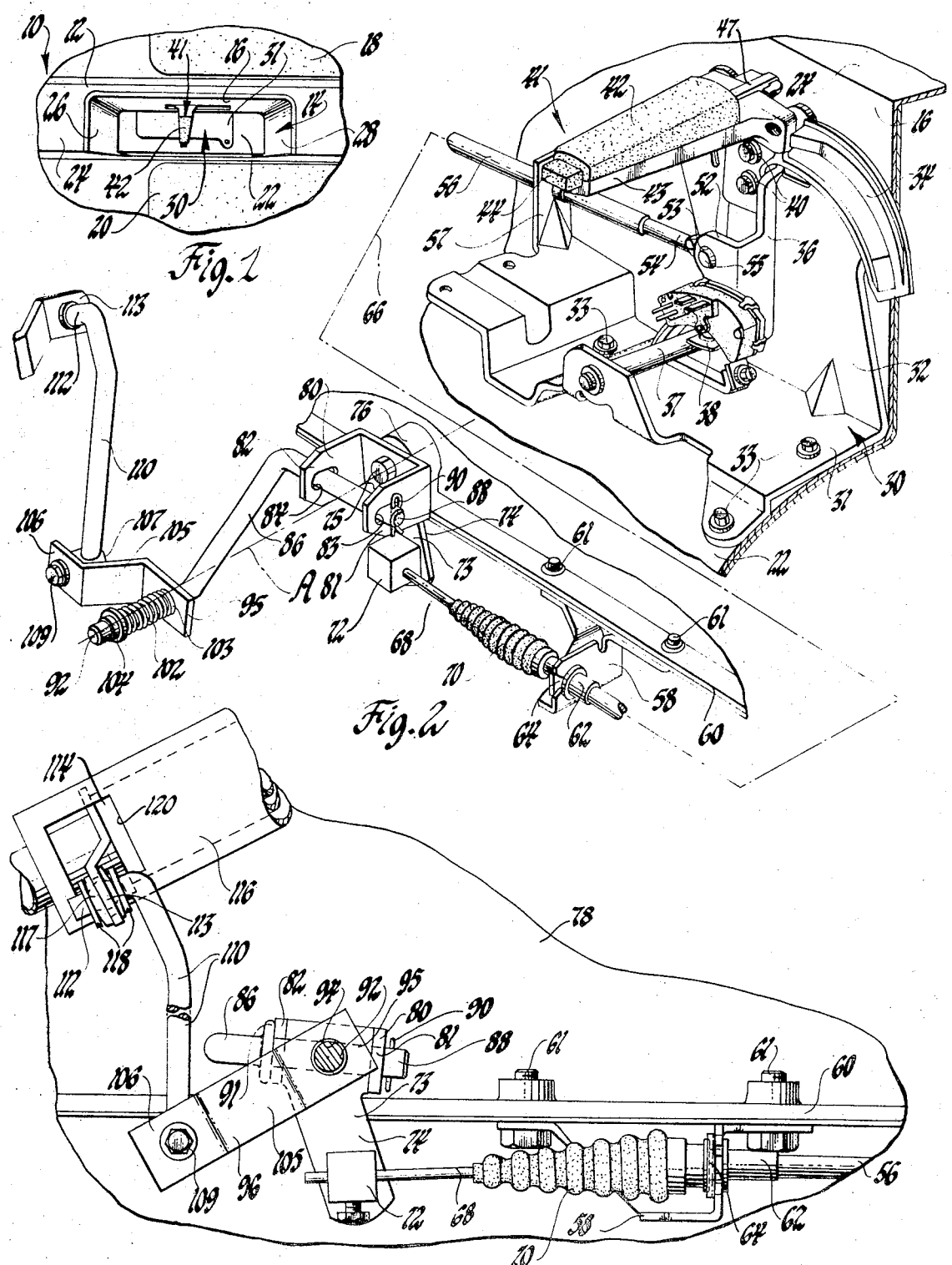

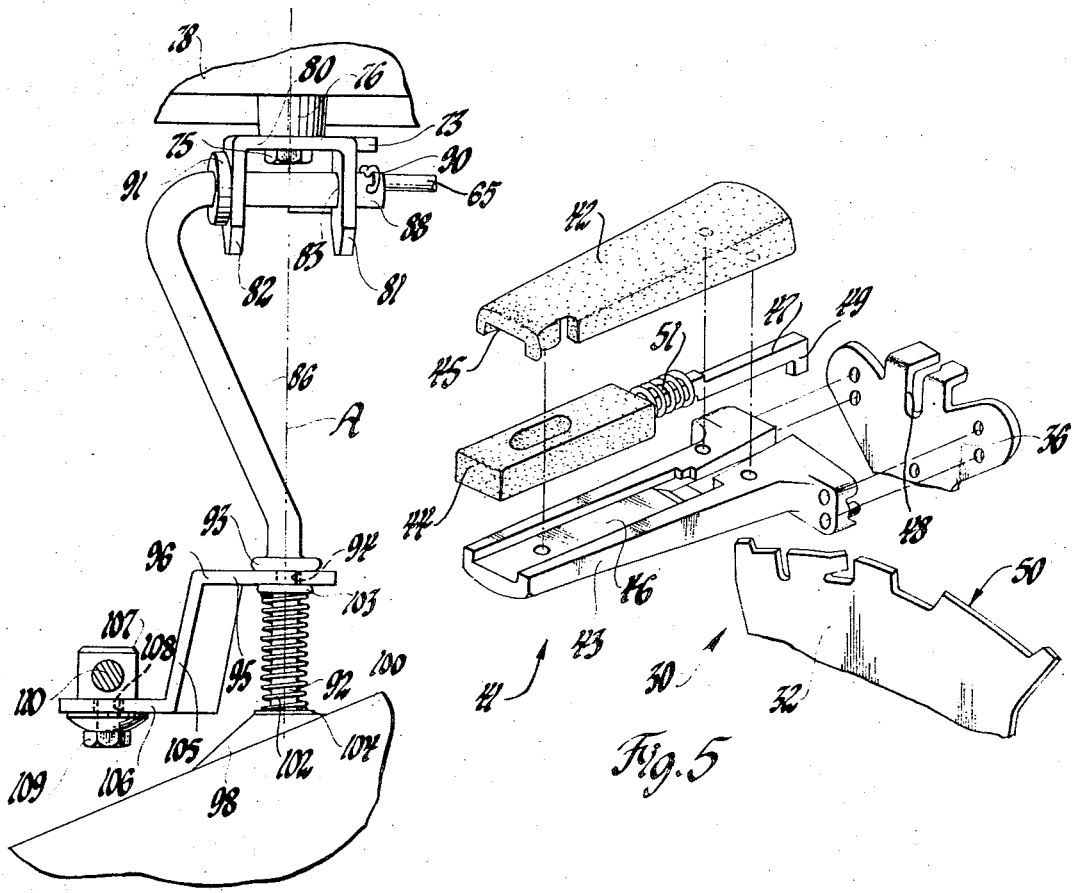
Fig. 4
Fig. 5
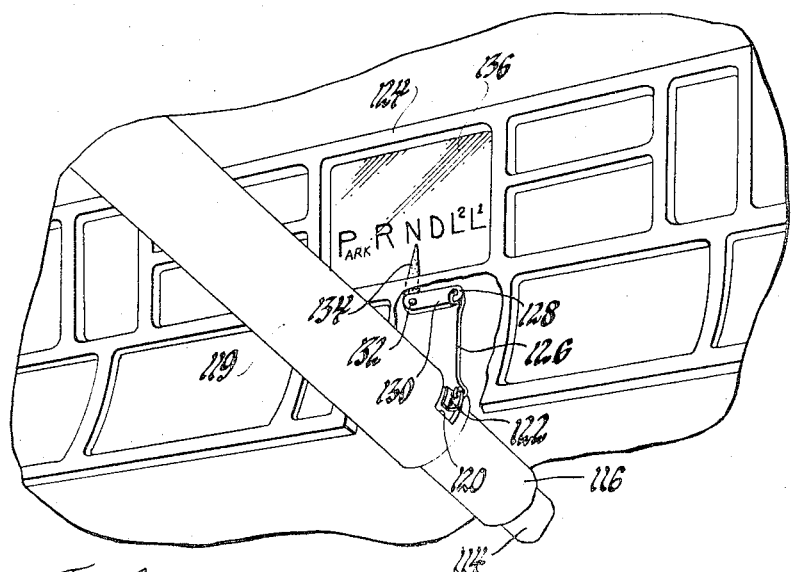
Fig. 6
INVENTOR.
Marshall W. Miller
BY
John P. Moran
ATTORNEY

TRANSMISSION CONTROL AND INDICATOR APPARATUS

This invention relates generally to transmission control and indicator apparatus and, more particularly, to a console-mounted automatic transmission shift control with an instrument panel-mounted driving range selection indicator therefor.

The usual automatic transmission control apparatus and indicator mechanism has previously included a steering column-mounted transmission control with an associated indicator mounted on or adjacent the instrument panel, or a pushbutton-type instrument panel-mounted control and indicator or, more recently, a console-type control and indicator, wherein the console includes both the control mechanism and the indicator mounted on the floor to the immediate right of the operator's seat.

This invention provides an improved floor-mounted console-type automatic transmission control wherein the selector handle is mounted in a recess formed in the console and suitable linkage means operatively connects the selector handle to both the usual transmission shift rod and the usual steering column shift tube for selecting a desired transmission driving range and for rotating the shift tube to correspond thereto, and wherein the resultant rotation of the shift tube is transferred by a connecting link to an indicator mounted in a window of the instrument panel.

Accordingly, a primary object of the invention is to provide a console-type transmission control and an instrument panel-mounted indicator responsive thereto.

Another object of the invention is to provide an improved transmission control and remote indicator wherein the control handle extends laterally toward the operator in a recess formed below the top surface of the console and suitable linkage operatively connects the control handle to both the transmission shift rod and the steering column shift tube.

A further object of the invention is to provide a control and indicator wherein suitable linkage and a "back-drive" rod cooperate with the shift tube of the steering column to operatively connect the indicator on the instrument panel to the control lever on the console, the steering column being substantially the same as that used for column-mounted shift levers.

These and other objects and advantages of the invention will be apparent when reference is made to the accompanying specification and drawings, wherein:

FIG. 1 is a fragmentary top view of a console-type transmission control mechanism embodied in the invention;

FIG. 2 is an enlarged fragmentary perspective view of the console-type transmission control mechanism partially illustrated in FIG. 1;

FIG. 3 is a fragmentary side view of a portion of FIG. 2;

FIG. 4 is a fragmentary top view of a portion of FIG. 2;

FIG. 5 is a view showing individual components of the FIG. 2 structure; and

FIG. 6 is a fragmentary perspective view of a steering column and an instrument panel embodying a portion of the invention.

Referring now to the drawings in greater detail, FIG. 1 illustrates the portion of a console-type transmission control mechanism 10 which is visible in a motor vehicle, wherein the console 12 includes a recess or pocket 14 having a sidewall or surface 16 located adjacent the front passenger's bucket seat 18 and spaced apart from the operator's bucket seat 20, a bottom surface 22 located substantially below the top surface 24 of the console 12, and front and rear walls 26 and 28, respectively. An L-shaped mounting bracket 30, better seen in FIGS. 2 and 5, is located in the recess 14 and includes a horizontal bottom plate 31 and an upright plate 32, and is secured to the console 12 bottom and side surfaces 22 and 16, respectively, by means of bolts 33. An arcuate shield 34 is formed on the mounting bracket 30 adjacent the upper portion thereof.

A lever 36 is pivotally mounted about a pivot pin 37 at the lower end 38 thereof on the bottom portion of the mounting bracket 30 and extends upwardly to a point adjacent the shield 34 to which it is secured by bolts 40. A range selector handle 41, having upper and lower halves 42 and 43, is secured by the bolts 40 to the lever 36 and the shield 34, such that the handle 41 extends laterally therefrom pointing toward the operator's seat 20 (FIG. 1). The handle 41 is mounted around a central release bar 44 and shaped so as to facilitate grippage thereof by the operator. It may be noted in FIG. 2 that the upper portion 42 of the handle 41 is located below the upper surface 24 of the console 12.

As illustrated in FIG. 5, the release bar 44 fits in recesses 45 and 46 formed in the handle members 42 and 43, respectively, and includes an extension 47 through an opening 48 formed in the lever 36. A projection 49 is formed on the end of the extension 47 and serves as a latch relative to an irregular upper edge 50 formed on the upright plate 32. A spring 51 on the extension 47 urges the latch 49 into position along the plate 32.

The lever 36 (FIG. 2) is formed to include a forwardly extended portion 52 in which an opening 53 is formed. A rod-shaped linkage member 54 is pivotally mounted on a pivot 55 in the opening 53 on the extended portion 52, extending therefrom toward the front of the vehicle. The linkage member 54 is slidably mounted in a sheath 56 which is supported adjacent the ends thereof by a brace 57 extending from the bottom plate 31 of the L-shaped mounting bracket 30, and at a forward portion thereof by a bracket 58 secured to the vehicle body 60 by bolts 61. The forward end 62 of the sheath 56 is secured to the bracket 30 by a retainer or yoke 64. A cable, represented generally by broken line 66, is slidably mounted inside the sheath 56, secured at its ends to the linkage member 54 and to a rod 68. A flexible stretchable cover 70 is secured at its ends to the forward end 62 of the sheath 56 and to the rod 68 and serves to protect the connection between the cable 66 and the rod 68 from atmospheric contaminants, such as dirt and dust. The outer end of the rod 68 is secured to a trunnion 72 which is pivotally connected to a leg 73 of a bracket 74. The bracket 74 is pivotally mounted on a transmission shift rod 75 rotatably mounted in an extension 76 from the transmission 78 (FIG. 3), the leg 73 extending perpendicularly from the axis of the shift rod 75. The bracket 74 further includes a U-shaped portion 80 formed by legs 81 and 82 extending away from the transmission 78 parallel to the axis of the shift rod 75 and having aligned openings 83 and 84 formed in the legs 81 and 82, respectively. A bent rod 86 has one end 88 extending through the aligned openings 83 and 84 and maintained in position therein by a cotter pin 90 and a flange 91 formed on the rod 86. The other end 92 thereof extends beyond a flange 93 formed thereon through an opening 94 formed near one leg 95 of a second bracket 96 and into a boss 98 formed on the vehicle frame 100. An "equalizer" or coil spring 102 is mounted around the end portion 92 of the rod 86 which extends through the bracket 96, between a washer 103 adjacent the bracket 96 and a retaining member 104 mounted on the boss 98, for a purpose to be described. The bracket 96 includes an angled center portion 105 and an oppositely disposed leg 106. A trunnion 107 is pivotally mounted through an opening 108 formed in the latter leg 106 of the bracket 96, and is held therein by a nut 109. A "back-drive" rod 110, including a bent end portion 112, extends between the trunnion 107 and another bracket or connection member 113 which is secured in any suitable manner, such as by press-fitting, on the lower portion of a shift tube 114 extending axially through the usual steering column 116 (FIG. 3). Spherical surfaced members 117 formed on the bracket 113, and adjacent flanges 118 on the bent end 112 of the rod 110 permit slight pivotal movement of the back-drive rod 110 without hampering rotary movement of the shift tube 114 by the back-drive rod 110, as will be explained.

Referring now to FIG. 6, it may be noted that the jacket 119 rotatably mounted on the steering column 116 includes a slot or opening 120, through which a small bracket 122 is secured to the upper portion of the shift tube 114 adjacent the instrument panel 124. A link 126 extends between, and is pivotally connected at its ends to the small bracket 122 and one leg 128 of an L-shaped indicator member 130, respectively. The latter is pivotally mounted on the instrument panel 124 by a pivot pin 132. A pointer 134 comprises the other leg of the indicator member 130 for arcuate movement along the usual automatic transmission selector positions, designated as "PARK," "R," "N," "D," "L²" and "L¹" in a window 136 of the instrument panel 124.

It should be noted at this point that the mast jacket 119, the steering column 116, and the shift tube 114 may be the same when either a column-mounted driving range selector or the console-type mechanism 10 is used. For the former, the range selector handle 41 would be mounted on the mast jacket 119 (FIG. 6), at an intermediate location thereon.

OPERATION

When the operator of the vehicle desires to select a different driving range, as readily visible on the instrument panel 124 illustrated in FIG. 6, he assumes a horizontal grip on the laterally extending range selector handle 41 of the console 12 at his right. He depresses the central release bar 44 with his thumb, releasing the projection 49 (FIG. 5) from its latched position along the upper edge 50 of the plate 32, and moves the range selector handle 41 in an arcuate manner until the pointer 134 (FIG. 6) is in the desired transmission selector position. Release of the release bar 44 permits the spring 51 (FIG. 5) to move the bar extension 47 to the left (FIG. 1) causing the projection 49 to lock the handle 41 in its new position.

In moving the handle 41 in this manner, the shield 34 and the lever 36 are also rotated about the pivot pin 37. Rotation of the lever 36 will, in turn, move the linkage rod 54 laterally either farther into or farther out of the fixed sheath 56, causing the cable 66 connected thereto to move the rod 68 at the other end thereof a like distance. Since the trunnion 72 is secured to the rod 68 and is pivotally connected to the leg 73 of the bracket 74, movement of the rod 68 will cause the bracket 74 to rotate about the axis of the extension 76 from the transmission 78. Inasmuch as the U-shaped portion 80 is secured to the transmission shift rod 75, rotation of the bracket 74 will rotate the shift rod 75 and result in selection of the desired driving ratio within the transmission 78.

Referring now to FIG. 4, it may be noted that rotation of the parallel legs 81 and 82 of the U-shaped bracket 80 will produce a responsive rotary movement of the end 88 of the bent rod 86 about the axis A which extends through the other end 92 and the boss 98 formed on the vehicle chassis or frame 100. The coil spring 102 serves to urge the bracket 96 away from the frame 100 and against the flange 93 while permitting any relative transverse movements between the rubber-mounted transmission 78 and the fixed chassis 100 to occur without detrimentally affecting cooperation among the various linking members. The openings 83 and 84 are in the bracket 80 are elongated in order to prevent binding therein of the end 88 of the rod 86.

Rotational movement of the rod 86 about the axis A initiated by the bracket 80 will produce corresponding rotational movement of the leg 95 of the bracket 96 which is secured for rotation with the end 92. Rotational movement of the leg 95 will, in turn, rotate the oppositely disposed leg 106 and the axis of the trunnion 107 in an arc about the axis A. Since the back-drive rod 110 is secured to the trunnion 107, it will likewise be moved at its trunnion end through the arc described by the axis of the trunnion 107. The other or bent end portion 112 (FIG. 3) will cause the bracket 113, mounted on the shift tube 114, to rotate the latter within the steering column 116. During such rotary movement of the shift tube 114, slight rocking or pivotal movement of the end 112 of the back-drive rod 110 is possible by virtue of the cooperating members 117 and flanges 118.

Referring now to FIG. 6, it may be realized that the small bracket 122 is mounted in the slot or opening 120 formed in the mast jacket 119 and is secured therein to the upper portion of the shift tube 114. Accordingly, rotation of the shift tube 114 will cause the bracket 122 to move the link 126. Movement of the link 126 serves to rotate the leg 128 of the L-shaped indicator member 130 about the pivot pin 132, thereby rotating the pointer 134 to the desired new selector position among those identified in the window 136 of the instrument panel 124 of FIG. 6 as "PARK," "R," "N," "D," "L²" and "L¹." It may be noted that the link 126, whose length directly transfers any rotary movement of the bracket 122 to pivotal movement of the leg 128 of the L-shaped indicator member 130, is free to pivot about its axis at its ends relative to the member 122 and the leg 128, eliminating any tendency to bind during the various pivoting movements of the bracket 122 and the leg 128.

It should be apparent that the invention provides a floor-mounted console-type transmission control mechanism while permitting the operator to readily observe the indicator selections on the instrument panel within his forward range of vision.

I claim:

1. For use with an automatic transmission, a transmission control and indicator mechanism comprising a floor-mounted console, a manually actuable driving range selector handle pivotably mounted on said console, a transmission shift rod rotatably connected to said transmission, a steering column shift tube, first linkage means operatively connecting said selector handle to said shift rod for rotating said shift rod to select a desired transmission drive ratio in response to pivotal movement of said selector handle and operatively connecting said selector handle to the lower portion of said shift tube for rotating said shift tube in response to said pivotal movement of said selector handle, an instrument panel-mounted indicator, and second linkage means operatively connected between the upper portion of said shift tube and said instrument panel-mounted indicator for pivoting said indicator to a designated selector position in response to rotation of said shift tube.

2. For use with an automatic transmission, a transmission control and indicator mechanism comprising a floor-mounted console, a manually actuable driving range selector handle pivotably mounted on said console, a transmission shift rod rotatably connected to said transmission, first linkage means operably connected between said selector handle and said shift rod for rotating said shift rod to select a desired transmission drive ratio in response to pivotal movement of said selector handle, a steering column shift tube, second linkage means operably connected between said first linkage means and the lower portion of said shift tube for rotating said shift tube in response to pivotal movement of said selector handle, an instrument panel-mounted indicator, and third linkage means operably connected between the upper portion of said shift tube and said instrument panel-mounted indicator for pivoting said indicator to a designated selector position in response to rotation of said shift tube.

3. The mechanism described in claim 2, wherein said first linkage means includes a lever pivotally mounted on said console and secured to said selector handle, a linkage rod pivotally connected to said pivotally mounted lever, a cable secured to one end to said linkage rod, a second rod secured to the other end of said cable, a trunnion secured to said second rod, and a bracket pivotally connected at one end thereof to said trunnion and secured at the other end thereof to said rotatably connected transmission shift rod.

4. The mechanism described in claim 3, wherein said bracket includes a pair of parallel members extending from opposite sides of said shift rod, and a first formed linkage rod having one end thereof extending through aligned openings formed in said extending members and the other end thereof mounted for slidable and pivotable movement in an opening formed in a vehicle frame, a flange formed on said first formed linkage rod and spaced apart from said other end thereof, a second bracket having a first opening formed therein and mounted through said opening on said other end of said first formed linkage rod adjacent said flange, resilient means mounted on said other end between said vehicle frame and said second bracket for maintaining said second bracket in contact with said flange and permitting relative movements between said transmission and said frame, a trunnion pivotally mounted through a second opening formed adjacent the other end of said second bracket, and a second formed linkage rod secured at one end thereof to said trunnion and pivotally mounted at the other end thereof on a connection member secured to said shift tube.

5. The mechanism described in claim 2, wherein said third linkage means includes a bracket mounted on said upper portion of said shift tube and a link connected at one end thereof to said bracket and at the other end thereof to said panel-mounted indicator, said link being mounted on said bracket and said indicator in a manner such that rotary movement of said shift tube and said bracket produces a corresponding pivotal movement in said indicator while said link is able to rotate about its axis to facilitate free movements among the various members.

6. A floor-mounted console-type transmission control mechanism and an instrument panel-mounted indicator for use with an automatic transmission, comprising a manual range selector handle mounted in a recess formed in said floor-mounted console, a first shaped bracket mounted on the transmission shift rod, first linkage means operatively connected between said selector handle and a first leg formed on said first shaped bracket, a second shaped bracket having an angled center section and located intermediate said transmission shift rod and the steering column shift tube, a first linkage rod member operatively connected between an opening formed adjacent one end of said angled center section of said second shaped bracket and aligned openings formed in second and third legs formed on said first shaped bracket, a second linkage rod member operatively connected between an opening formed adjacent the other end of said angled center section of said second shaped bracket and the lower portion of said shift tube, and a link pivotally connected between the upper portion of said shift tube and said instrument panel-mounted indicator for readily visible indication of the driving range corresponding to the position of said selector handle.

7. For use with an automatic transmission, a transmission control and indicator mechanism comprising a floor-mounted console having a recess formed therein, a manually actuable range selector handle rotatably mounted in said recess, a transmission shift rod rotatably connected to said transmission, a bracket secured to said rotatable shift rod, said bracket including a first leg extending perpendicularly from the axis of said shift rod and second and third legs extending parallel to said axis of said shift rod on opposite sides thereof and aligned openings formed in said second and third legs, first linkage means operably connected between said selector handle and said first leg of said bracket for rotating said bracket and said shift rod in response to movement of said selector handle, a steering column shift tube, second linkage means operably connected between said aligned openings of said bracket and the lower portion of said shift tube for rotating said shift tube in response to movement of said bracket, an instrument panel-mounted indicator, and third linkage means operably connected between the upper portion of said shift tube and said instrument panel-mounted indicator for pivoting said indicator in response to rotation of said shift tube.

8. The mechanism described in claim 7, wherein said second linkage means includes a first formed rod member having one end thereof extending through said aligned openings and the other end thereof pivotally and slidably mounted in a vehicle frame, a second bracket including an angled center portion and having a first opening formed adjacent one edge of said angled center portion and a second opening formed adjacent the other edge of said angled center portion, said other end of said formed rod member extending through said first opening, a flange formed on said other end, a spring mounted on said other end between said frame and said second bracket for maintaining said second bracket against said flange and for preventing any relative movements between said transmission and said frame from detrimentally affecting said second linkage means, a trunnion member pivotally connected in said second opening, and a second formed rod member having one end secured to said trunnion member and the other end pivotally connected to said lower portion of said shift tube.